United States Patent [19]

Simpson, Jr.

[11] Patent Number: 5,575,490

[45] Date of Patent: Nov. 19, 1996

[54] ICE FISHING SLED AND CADDY

[76] Inventor: Donald V. Simpson, Jr., 27 Mountain View Rd. P.O. Box 1053, Gray, Me. 04039-1053

[21] Appl. No.: 328,036

[22] Filed: Oct. 24, 1994

[51] Int. Cl.$^6$ ................................................ B62B 13/02
[52] U.S. Cl. ..................... 280/28.12; 114/43; 280/28.15
[58] Field of Search ........................... 280/15, 18, 28.12, 280/28.15, 28.17; 114/43, 61

[56] References Cited

U.S. PATENT DOCUMENTS

| | | | |
|---|---|---|---|
| D. 279,361 | 6/1985 | Peckels et al. | D12/9 |
| D. 313,061 | 12/1990 | Bascom et al. | D22/134 |
| D. 339,842 | 9/1993 | Spiczka | D22/134 |
| 664,215 | 12/1900 | Hickson | 280/28.15 |
| 3,504,924 | 4/1970 | Nesbit | 280/15 X |
| 4,530,509 | 7/1985 | Maxwell, Jr. | 280/22 |
| 4,573,695 | 3/1986 | Kennel | 280/20 |
| 4,730,569 | 3/1988 | Colson | 280/28.12 X |

*Primary Examiner*—Anne Marie Boehler
*Assistant Examiner*—Michael Mar
*Attorney, Agent, or Firm*—David L. Baker; Rhodes & Ascolillo

[57] ABSTRACT

A sled apparatus for transportation and storage of equipment has a lower housing. There is an equipment chamber in the lower housing. A first runner and a second runner are connected to the lower housing. These runners are preferably an integral part of the lower housing and may be molded as one part. The runners could have small chambers of their own to store equipment. There is also a storage platform connected to the lower housing. A first outrigger runner and a second outrigger runner are connected to the storage platform. There is at least one bucket retaining pod and at least one long item retaining port in the storage platform. There is also at least one short item retaining port in the storage platform. An auger retaining platform is connected to the lower housing. There is an auger retaining member removably connected to the auger retaining platform. There is at least one towing port on the auger retaining platform and a towing member is attached to the towing ports. The storage platform also helps support the auger.

2 Claims, 3 Drawing Sheets

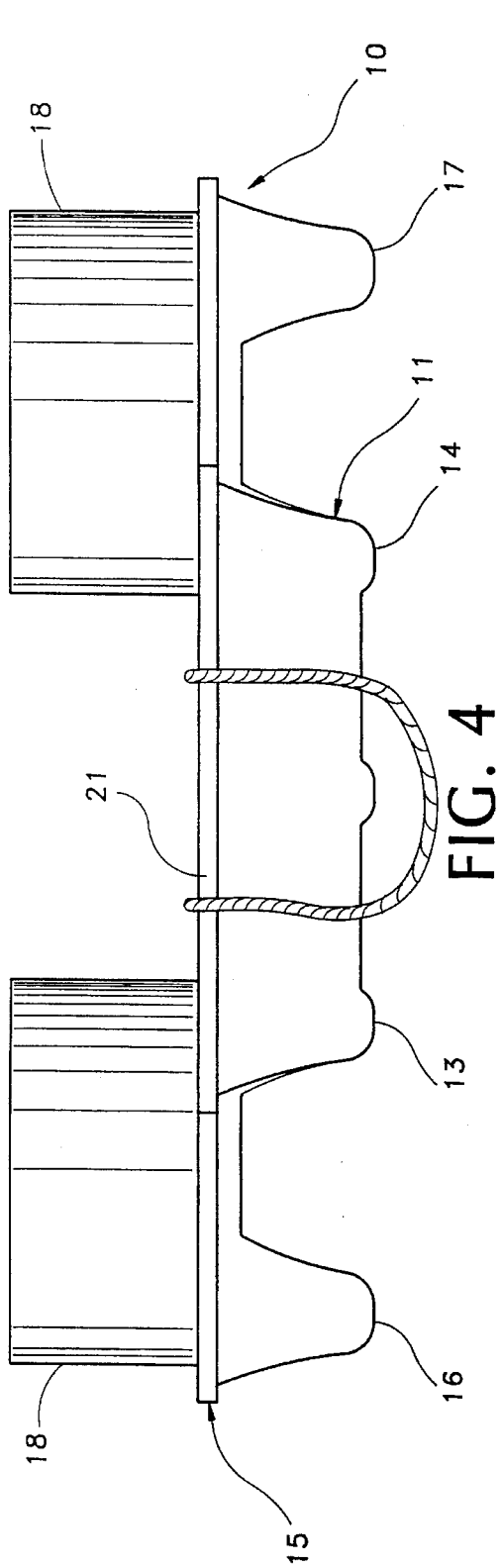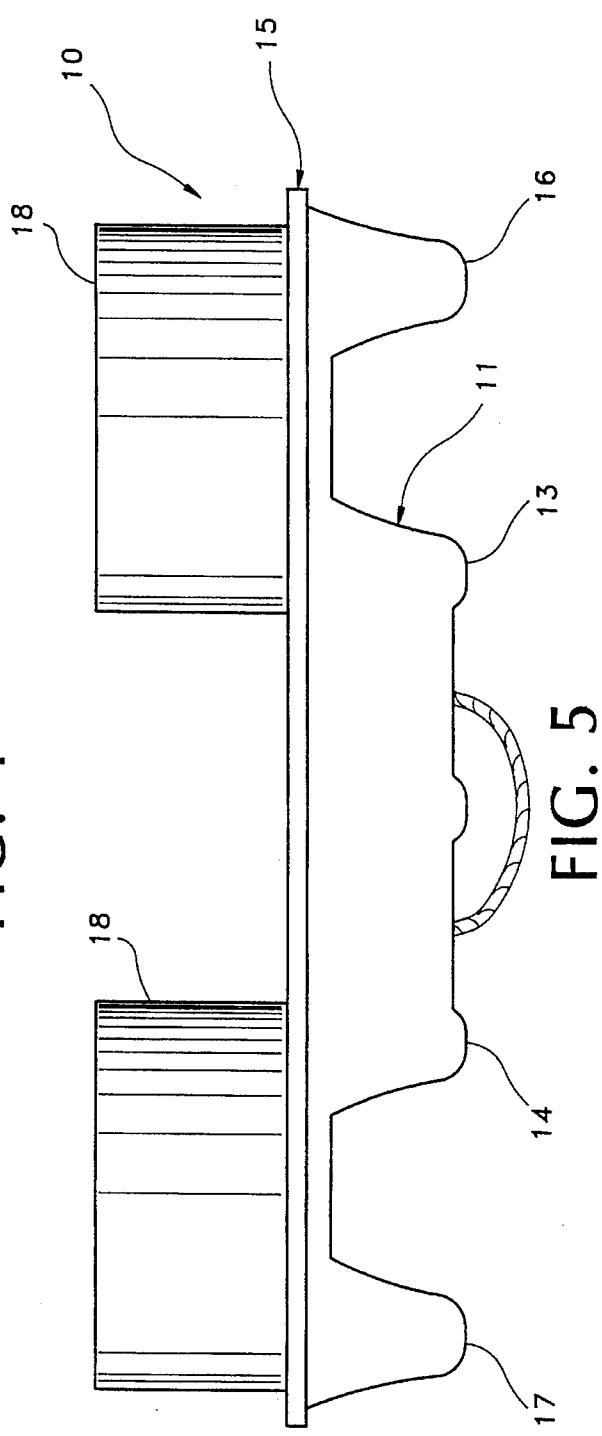

ICE FISHING SLED AND CADDY

BACKGROUND OF THE INVENTION

1. Field of the Invention

This invention relates to an apparatus for storing and transporting ice fishing equipment.

2. Description of the Related Art

Sleds have been around for many years. A few sleds for ice fishing have been developed. But none have been developed for the ice fishing enthusiast that uses an auger and desires to secure a five gallon bucket to the sled in a manner that will easily reduce the chance of the bucket sliding off and possibly spilling its contents. Nor have any previous ice sleds provided the stability of the present invention.

U.S. Pat. No. Des. 279,361 to K. T. Peckels, et al., on Jun. 25, 1985 for an ice fishing sled shows a box-like sled.

U.S. Pat. No. 4,530,509 to J. A. Maxwell, Jr. on Jul. 23, 1985 for a sled describes having tubular flexible runners and a steering mechanism that allows the runners to be bowed to assist steering.

U.S. Pat. No. 4,573,695 to G. H. Kennel on Mar. 4, 1986 for a sled apparatus describes a portable backpacking sled that can be collapsed to a thin configuration.

U.S. Pat. No. Des. 313,061 to C. Bascom, et al., on Dec. 18, 1990 for a portable, collapsible ice fishing sled shows line reels and a pull strap thereon.

U.S. Pat. No. Des. 339,842 to H. D. Spiczka on Sep. 28, 1993 for an ice fishing sled shows a sled having a removable top section having holes therein.

The present invention provides at least one and preferably two bucket retaining pods a novel means to support and secure an auger and provides outriggers to steady the load.

SUMMARY OF THE INVENTION

Ice fishing has become an ever increasingly popular sport. Although the environment can be harsh, the rewards can be great in the size of and the amount of fish taken home. More equipment is needed to ice fish than is needed to bait a hook and fish from a bank in the summertime. A hole has to be cut in the ice. The ice, depending on the severity of the season, may be quite thick. Often an ice auger (drill) must be employed to reach the water. Buckets for bait and to sit upon are needed along with a tip-up fishing rig, food and even shelter from inclement weather. All these item are bulky and cumbersome to carry and often require several trips to the fishing site if carried in the arms of the user. The present invention greatly enhances the enjoyment of the sport and eases the burden of the fisherman by providing an ice fishing sled and caddy designed to transport all the equipment needed to the site pulled along behind the user. The sled and caddy invention can also be packed with the pre-prepared fishing equipment the night before allowing the user to arise and not have to worry about forgetting something in his or her haste or drowsiness.

In one aspect of the present invention, a sled apparatus for transportation and storage of equipment is described. The sled apparatus includes a lower housing. There is an equipment chamber in the lower housing. A first runner and a second runner are connected to the lower housing. A storage platform is connected to the lower housing. A first outrigger runner and a second outrigger runner are connected to the storage platform. There is at least one bucket retaining pod on the storage platform. There may be at least one long item retaining port and at least on short item retaining port the storage platform.

In a second aspect of the present invention, a sled apparatus for transportation and storage of equipment is described. The sled apparatus has a lower housing and an equipment chamber in the lower housing. There is a first runner and a second runner connected to the lower housing. A storage platform is connected to the lower housing. A first outrigger runner and a second outrigger runner are connected to the storage platform. There is at least one bucket retaining pod on the storage platform. There is an auger retaining platform on the lower housing and an auger retaining member connected to the auger retaining platform.

It is an object of this invention to provide an ice fishing sled and caddy to transport ice fishing equipment to and from an ice fishing location.

BRIEF DESCRIPTION OF THE DRAWINGS

FIG. 4 is a front elevational view of the ice fishing sled and caddy.

FIG. 5 is a rear elevational view of the ice fishing sled and caddy.

DESCRIPTION OF THE PREFERRED EMBODIMENT

Figure 1:
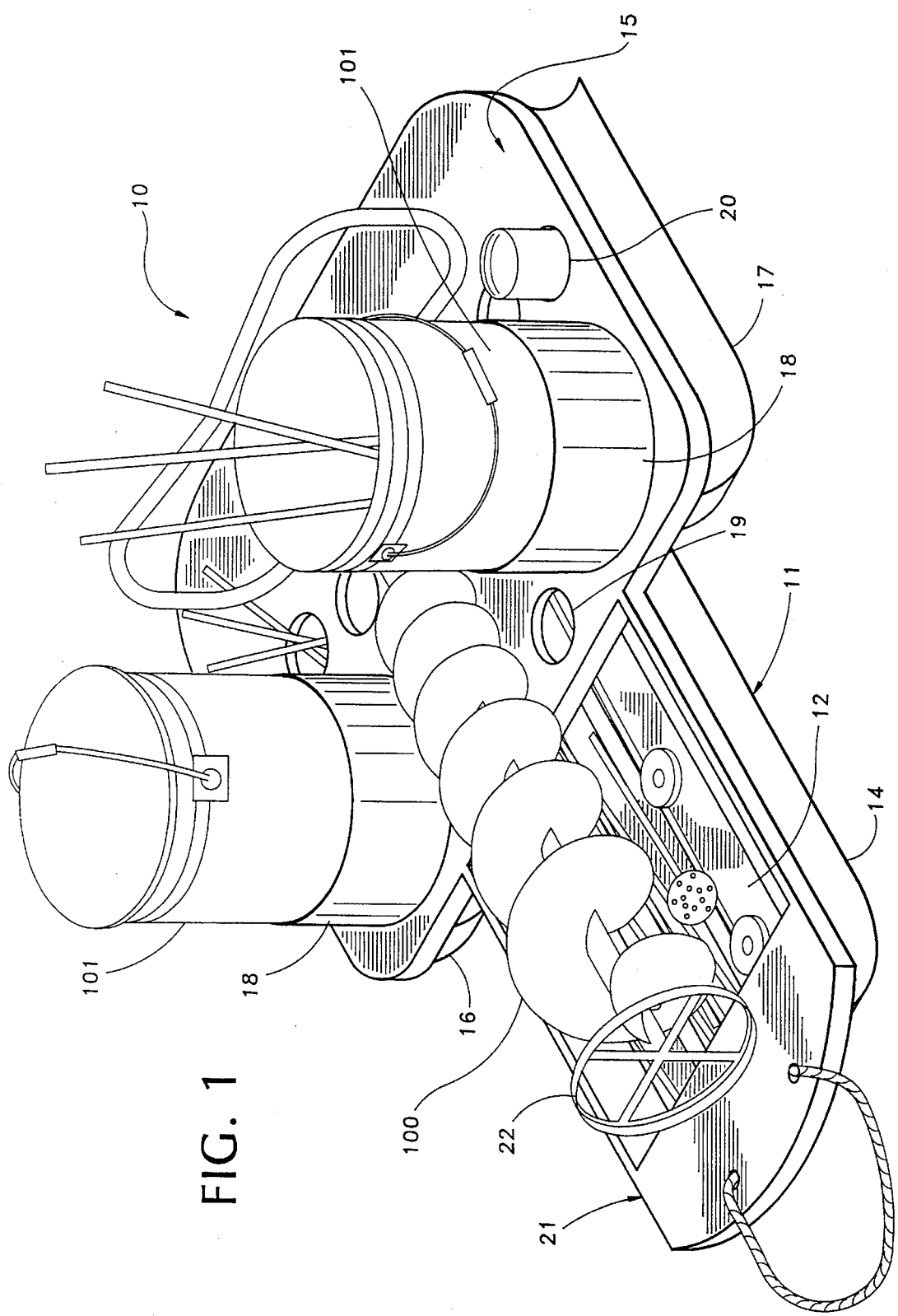
FIG. 1 is a perspective view of the ice fishing sled and caddy shown loaded with ice fishing equipment to better show its function and usefulness.
Figure 2:
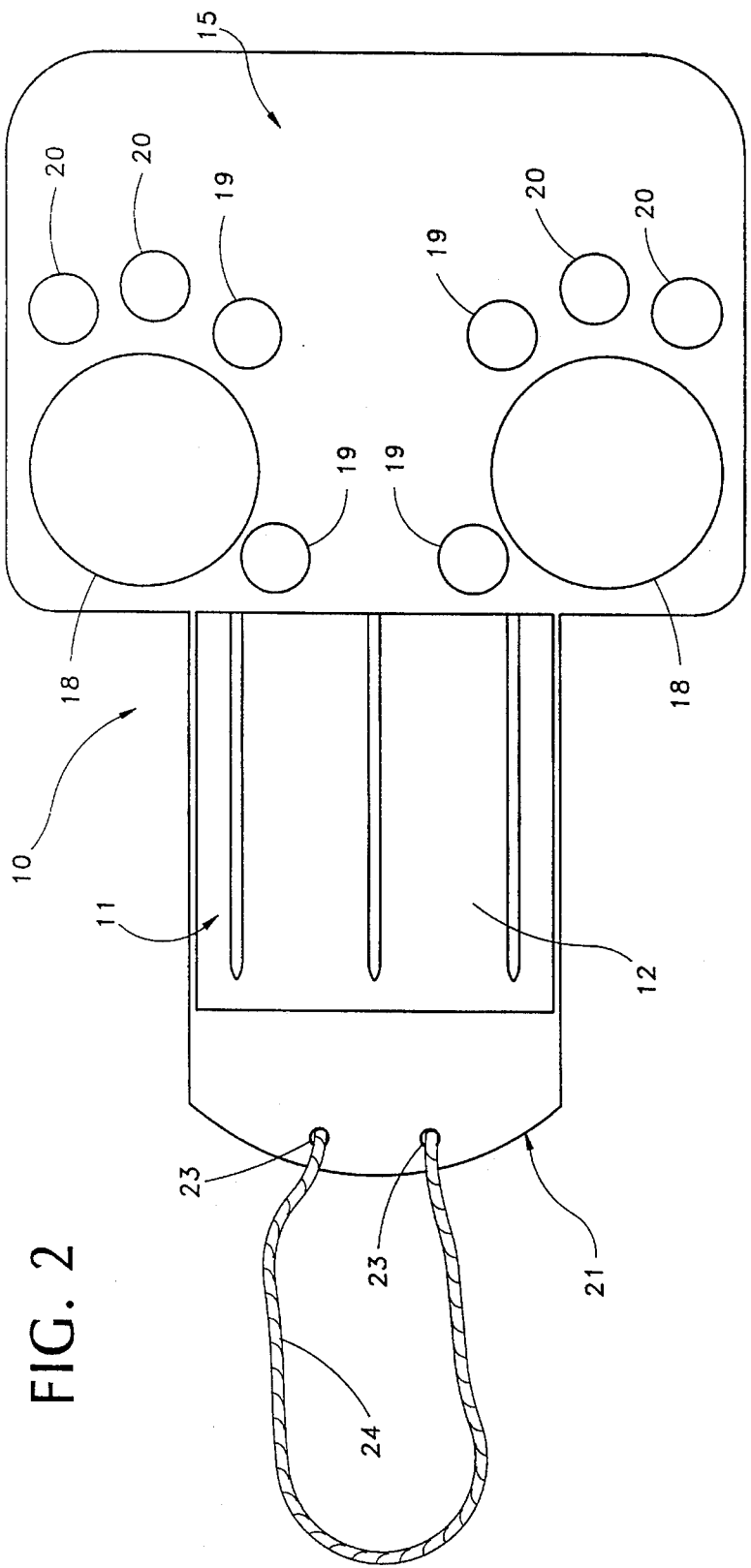
FIG. 2 is a top plan view of the ice fishing sled and caddy.
Figure 3:
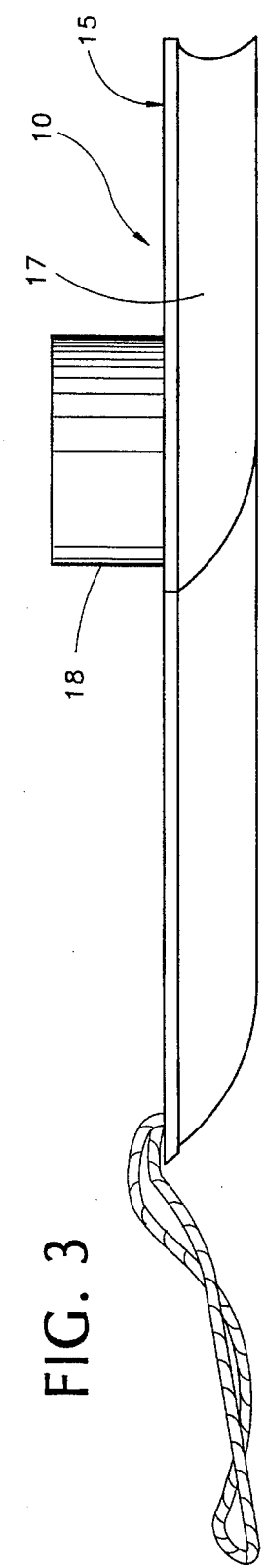
FIG. 3 is a left side elevational view of the ice fishing sled and caddy.

Referring to FIGS. 1 through 5, a sled apparatus 10 for transportation and storage of ice fishing equipment (shown in FIG. 1 on the sled apparatus) is shown and described. The sled apparatus 10 has a lower housing 11. There is an equipment chamber 12 in the lower housing 11. A first runner 13 and a second runner 14 are connected to the lower housing 11. These runners are preferably an integral part of the lower housing 11 and may be molded as one part. The runners could have small chambers of their own to store equipment. There is also a storage platform 15 connected to the lower housing. A first outrigger runner 16 and a second outrigger runner 17 are connected to the storage platform 15. The lower housing 11, the runners 13 and 14, the storage platform 15 and the auger retaining platform 21 are preferably made of plastic. They could also be made of wood or metal if desired.

There is at least one bucket retaining pod 18 (preferably two) and at least one long item retaining port 19 (usually several) in the storage platform 15. There is also at least one short item retaining port 20 (usually several) in the storage platform 15. An auger retaining platform 21 is connected to the lower housing 11. There is an auger retaining member 22 removably connected to the auger retaining platform 21. The auger retaining member 22 may be attached to the auger retaining platform 21 by a releasable clamp (not shown). The auger retaining platform 21, the bucket pods 18 and the auger retaining member 22 may be made of the same materials or any combination of them as the rest of the sled 10 and the auger retaining member may be attached to the auger 100 by threaded connecter (not shown) or inserted into a firm-fitting receptacle (not shown) that is designed to receive the end of the auger 100. There is at least one towing port 23 (preferably two) on the auger retaining platform 21 and a towing member 24 (such as a rope or handle) is attached to the towing ports 23. The storage platform 15 also helps support the auger 100 (as shown in FIG. 1). The ports 19, 20 and 23 could be cut into the platforms or formed at the time the platforms are molded. The storage platform 15, runners 13 and 14 outriggers 16 and 17 and auger retaining platform 21 could be all one piece that is adhered or fastened by suitable fasteners (not shown) such as clamps or bolts to the lower housing 11, or the storage platform 15 and the auger retaining platform 21 could be fastened to the lower housing 11 separately, and the outriggers 16 and 17 (extended runners) fastened to the storage platform 15 separately. The bucket retaining pods 18 can be molded as part of the storage platform 15 or attached separately by fasteners or adhesives.

Standard five gallon buckets 101 may be placed in the bucket retaining pods 18. These buckets may be used to transport and store a bait bucket, a big fish or other equipment and supplies (some of which are shown in FIG. 1). The pods 18 could also hold the tip-up ice fishing rig (not shown). The long item retaining ports 19 could hold jig poles, tent poles or other long items (see FIG. 1). The long item retaining ports are open to the equipment chamber. The short item retaining ports 20 are positioned over the outrigger runners 16 and 17 and can be used to transport or support cans, bottles, thermos bottles and glasses and the like (see FIG. 1). The auger retaining member 22 is removably attached to the auger support platform 21 and can be transported attached to the auger 100 if the auger is to be placed temporarily somewhere else. The sled 10 may be loaded and pulled easily to the ice fishing site then reloaded when the user is finished fishing and pulled back to the bank. The present invention not only eases the chore of getting all of the users equipment to the fishing site it also provides an incentive to clean up the fishing site of any trash since the trash can be so easily transported.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. A sled apparatus for transportation and storage of equipment, the sled apparatus comprising:

an elongated lower housing having an equipment carrying chamber formed by longitudinally extending sidewalls and a bottom wall, the bottom wall having a pair of longitudinally extending runners formed along a lower surface, a first outrigger runner extending longitudinally along a rearward portion of one sidewall of the lower housing and integrally connected thereto, a second outrigger runner extending longitudinally along a rearward portion of an opposite sidewall of the lower housing and integrally connected thereto, each of the first and second outrigger runners having a storage area contained therein and a bottom surface lying substantially in a common plane with the runners of the lower housing, a substantially planar platform having a forward portion and a rearward portion, the rearward portion being wider than the forward portion, the platform having a lower surface connected to upper edge portions of the lower housing and the first and second outrigger runners, an enlarged opening formed in the forward portion of the platform for permitting access to the lower housing, and a plurality of hollow cylindrical shaped members extending upwardly from an upper surface of the rearward portion of the platform for supporting containers received therein.

2. A sled apparatus for transportation and storage of equipment as described in claim 1, further comprising a plurality of circular openings formed in the rearward portion of the platform for supporting articles received therethrough.

\* \* \* \* \*